United States Patent [19]

McDowell

[11] 4,074,522
[45] Feb. 21, 1978

[54] ROTARY ENGINE

[76] Inventor: Jimmy J. McDowell, P.O. Box 11456, Tucson, Ariz. 85706

[21] Appl. No.: 721,321

[22] Filed: Sept. 7, 1976

[51] Int. Cl.$^2$ .............................................. F02C 5/02
[52] U.S. Cl. .................................. 60/39.61; 123/8.09; 123/8.23; 418/12; 123/8.15
[58] Field of Search ..................... 123/8.23, 8.09, 8.15, 123/8.41; 60/39.61, 39.63

[56] References Cited

U.S. PATENT DOCUMENTS

| 940,474 | 11/1909 | Piestrak | 60/39.63 X |
|---|---|---|---|
| 1,147,428 | 7/1915 | Peterson | 123/8.15 |
| 3,844,117 | 10/1974 | Ryan | 123/8.23 X |
| 3,932,987 | 1/1976 | Munzinger | 60/39.63 X |
| 3,989,011 | 11/1976 | Takahashi | 123/8.23 |

*Primary Examiner*—Clarence R. Gordon

[57] ABSTRACT

A main rotatable shaft is journaled relative to a support structure and a pair of rotary pumps are driven from the main shaft. The rotary pumps include independent inlets and independent outlets and the outlets converge toward and are joined at the inlet portion of juncture structure including an outlet opening into a combustion chamber. The individual outlets for the air pumps include check valves intermediate the pumps and the aforementioned juncture structure and the combustion chamber includes ignition structure for igniting a combustible mixture therein. Further, the combustion chamber includes an outlet and a rotary motor including a rotor portion drivingly connected to the main shaft includes an inlet to which the outlet for the combustion chamber is connected. Accordingly, the rotary pumps are driven from the main shaft which is in turn driven by the rotary motor, one of the rotary pumps being operative to pump air therethrough and into the juncture structure and the other of the rotary pumps being operative to receive an overly rich air and fuel mixture from a suitable charge forming device and to pump the overly rich air and fuel mixture into the juncture structure for commingling with the air pumped to the juncture structure by the first rotary pump. Thereafter, a mixture of air and the overly rich air and fuel mixture is discharged into the combustion chamber for admission therein and the rotary motor is driven by the exhaust from the combustion chamber.

10 Claims, 4 Drawing Figures

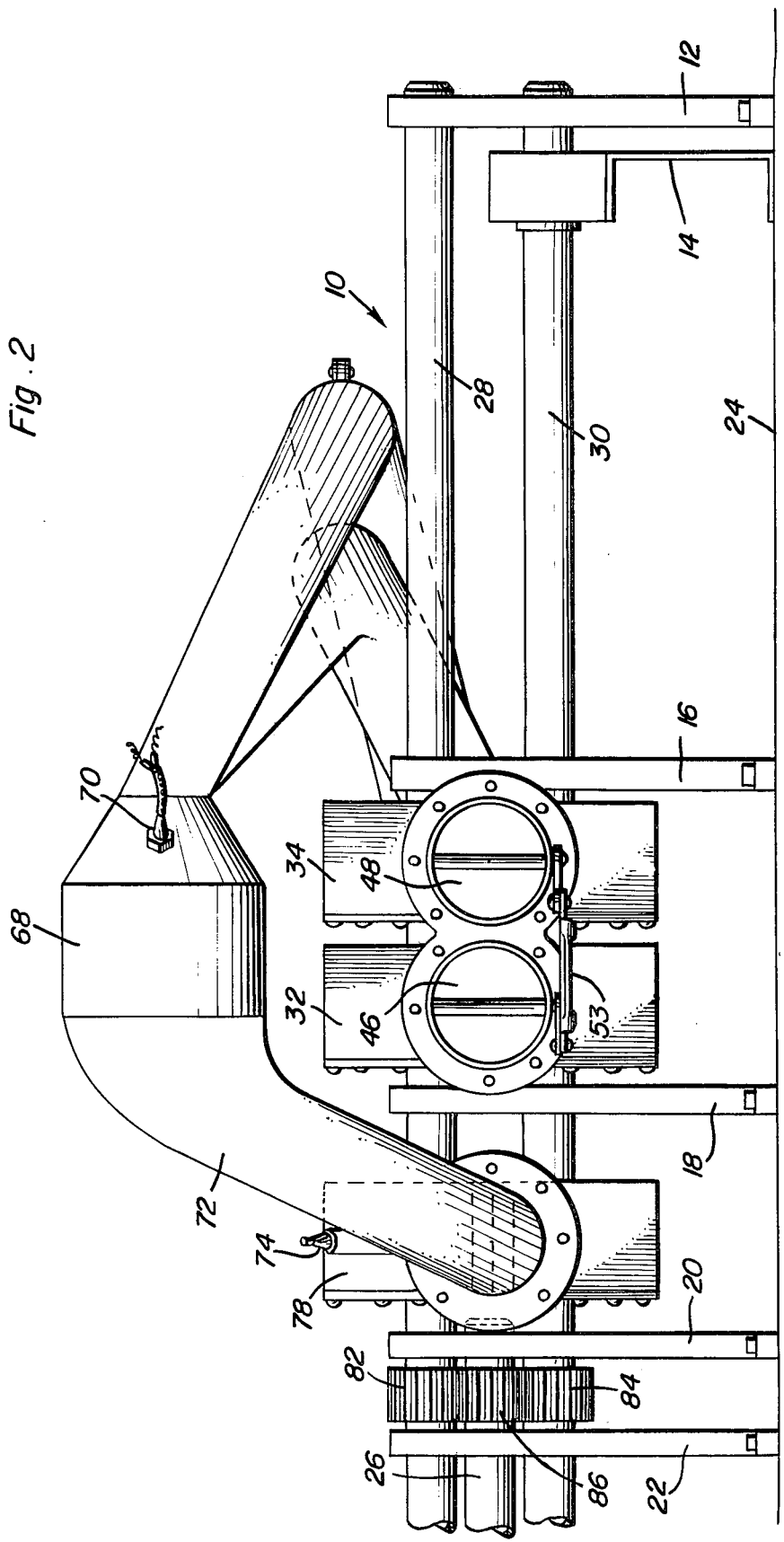

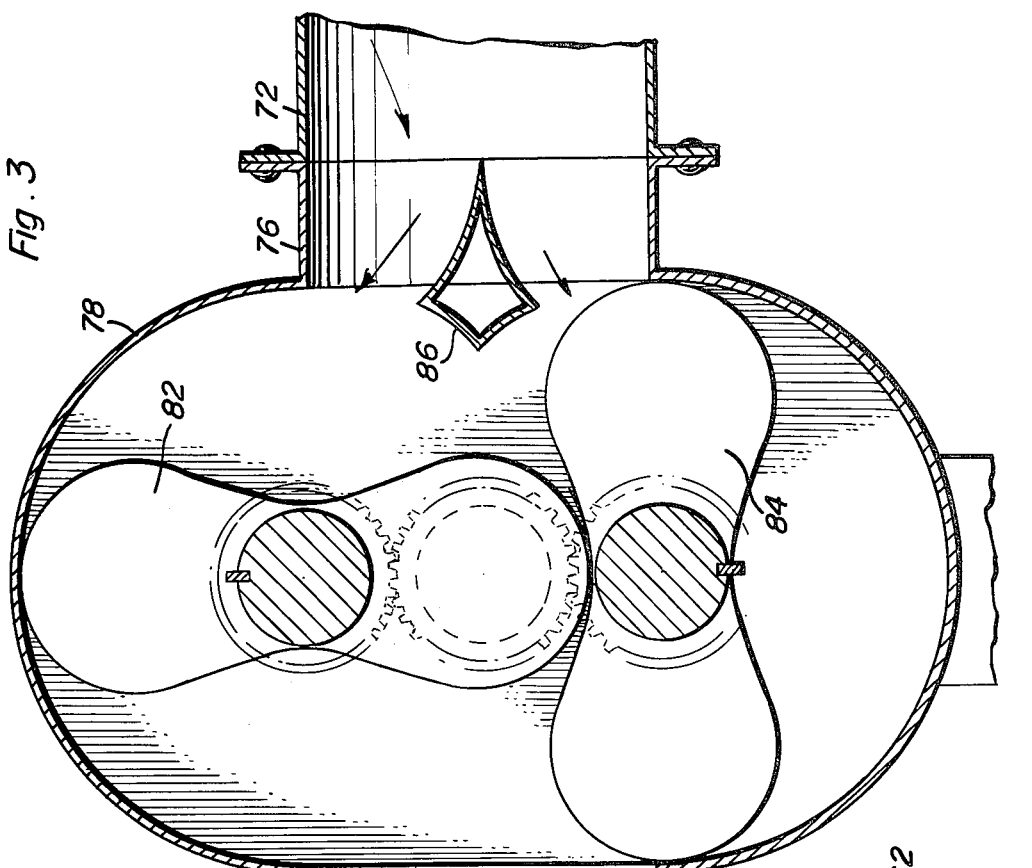
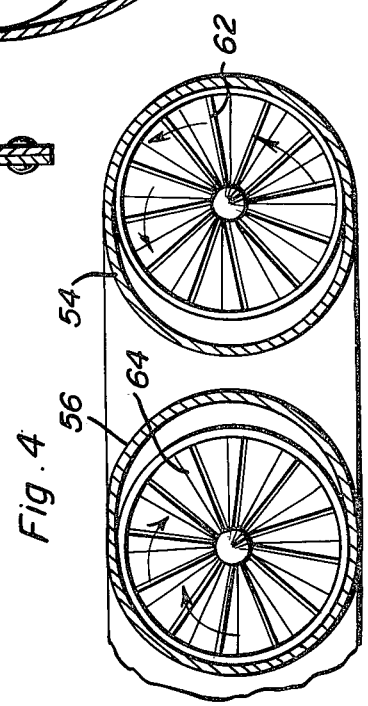

ROTARY ENGINE

BACKGROUND OF THE INVENTION

Various forms of rotary motors have been provided to burn various types of fuels. In addition, some rotary motors include rotary pumps or compressors for delivering combustible air and fuel mixtures to a combustion chamber and a rotary motor for driving by the exhaust from the combustion chamber. In addition, some rotary motors of the aforementioned type include a common shaft from which rotary pumps or compressors and driven and which is driven by the rotary motor.

However, various forms of these aforementioned types of rotary engines or motors have not been constructed so as to be capable of burning various different forms of fuel in an efficient manner. Still further, some forms of these previously known motors or engines have included relatively complex structure and are subject to frequent maintenance problems.

Examples of rotary motors or engines including some of the general structural and operational features of the instant invention are disclosed in U.S. Pat. Nos. 1,923,500, 2,845,909, 2,870,752, 3,115,124, 3,297,006, 3,363,606, 3,391,678, 3,724,427 and 3,789,809.

BRIEF DESCRIPTION OF THE INVENTION

The rotary engine of the instant invention includes a main shaft from which first and second rotary pumps or compressors are driven. One of the compressors pumps air to a juncture structure and the other rotary compressor pumps an overly rich air and fuel mixture to the juncture structure at which the air from the first compressor and the overly rich air and fuel mixture from the second compressor are thoroughly mixed together. This ultimate mixture of air and fuel then passes through a restricted flow zone into a combustion chamber and is ignited therein and the exhaust from the combustion chamber is ducted to a rotary motor which drives the same shaft from which the first and second rotary compressors are driven.

The main object of this invention is to provide a rotary engine which will be capable of burning numerous different types of fuel.

Another object of this invention is to provide a rotary engine in accordance with the preceding object and which includes only a few moving parts.

Yet another object of this invention is to provide a rotary engine which may be adapted for use in various environments.

Another important object of this invention is to provide a rotary engine of the type including a combustion chamber which is substantially continuously heated by the temperature of combustion gases and which will therefore be capable of operation with the exhaust gases thereof containing only very minimal amounts of air pollutant properties.

A final object of this invention to be specifically enumerated herein is to provide a rotary engine which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the engine with the carburetor thereof removed;

FIG. 3 is an enlarged transverse, vertical sectional view taken substantially upon a plane passing through the rotary motor portion of the invention; and FIG. 4 is an enlarged fragmentary, vertical, sectional view taken substantially upon the plane indicated by the section line 4—4 of FIG. 1.

DETAILED DESCRIPTION OF THE INVENTION

Figure 1:
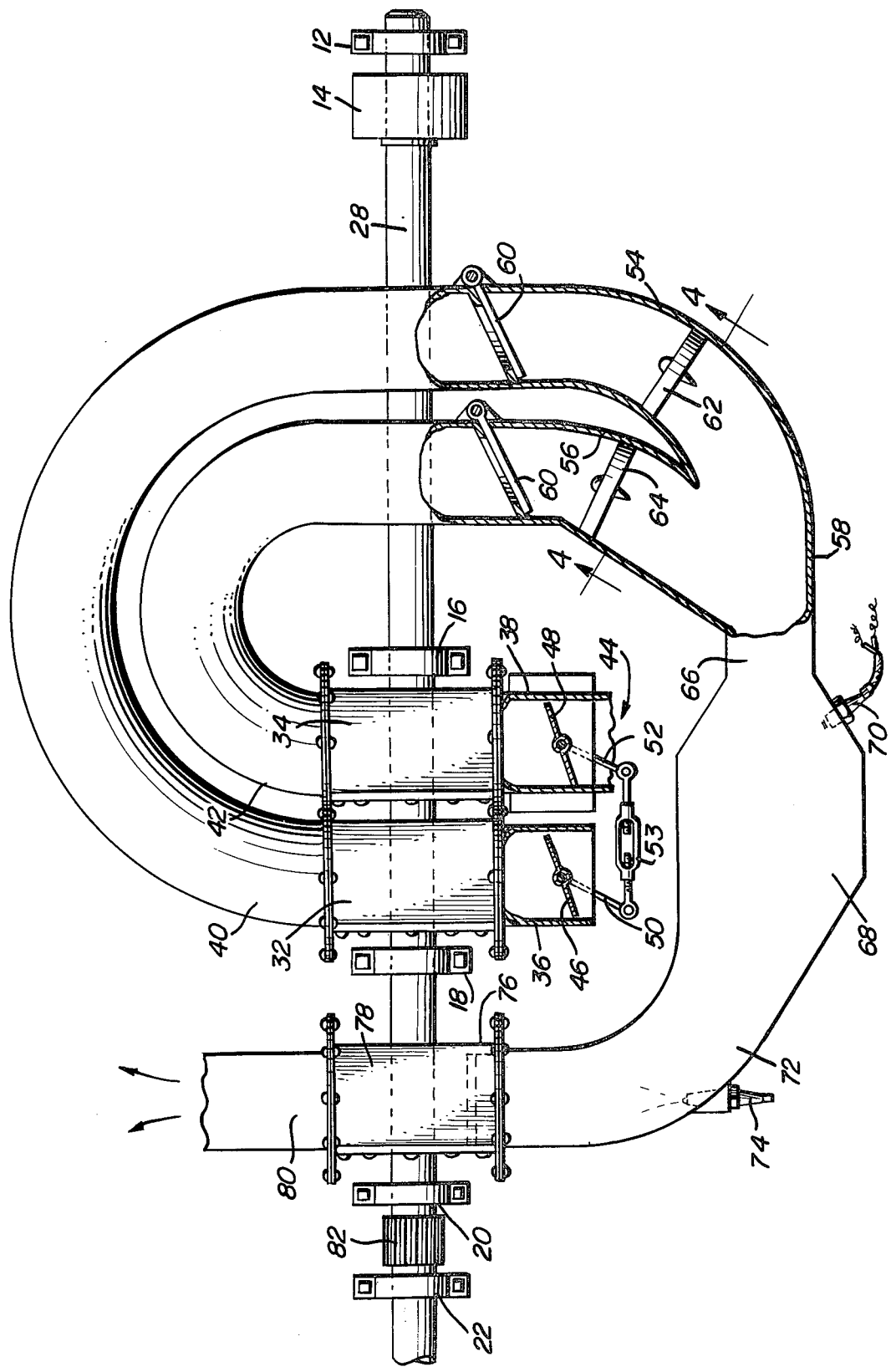
FIG. 1 is a top plan view of the engine with parts thereof being broken away and illustrated in horizontal section.

Referring now more specifically to the drawings, the numeral 10 generally designates the engine of the instant invention including a plurality of upstanding supports 12, 14, 16, 18, 20 and 22 which are secured to an project upwardly from a suitable support surface 24. A main shaft 26 is journaled from the supports 20 and 22 and a pair of parallel auxiliary shafts 28 and 30 are also provided. The shaft 28 is journaled from the supports 12, 16, 18, 20 and 22 and the shaft 30 is journaled from the supports 12, 14, 16, 18, 20 and 22.

A pair of Roots-type compressor casings 32 and 34 are mounted on the shafts 28 and 30 intermediate the supports 16 and 18 and rotatably receive the shafts 28 and 30 therethrough. The casings 32 and 34 include inlets 36 and 38 and outlets 40 and 42. An air and fuel mixing device referred to in general by the reference numeral 44 is operatively associated with the inlet 38 and the inlets 36 and 38 include flow controlling butterfly valves 46 and 48 oscillatably supported therein. The valves 46 and 48 include generally parallel control arms 50 and 52 disposed exteriorly of the inlets 36 and 38 and interconnected by means of an adjustable length connecting link assembly 53 to which any suitable form of throttle control mechanism (not shown) may be connected.

The outlets 40 and 42 comprise elongated ducts having outlet ends 54 and 56 which merge together and open into a hollow juncture chamber or structure 58. Each of the ducts 40 and 42 has a pivoted check valve 60 disposed therein intermediate its opposite ends and the outlet end 54 of the duct 40 is provided with a free turning turbine 62 which rotates in a counterclockwise direction, as viewed in FIG. 4 of the drawings, while the outlet end 56 of the duct 42 includes a free turning turbine 64 which rotates in a clockwise direction, as viewed in FIG. 4.

The juncture chamber or structure 58 discharges through a reduced cross-sectional flow area 66 into the interior of a combustion chamber 68 having a glow plug 70 operatively associated therewith. The combustion chamber 68 includes a tapered outlet 72 into which a water injector 74 opens and the outlet neck 72 discharges into the inlet 76 of a Roots-type rotary motor casing 78 having an outlet 80. The casing 78 is supported from and rotatably receives the shafts 28 and 30 therethrough.

The shafts 28 and 30 include gears 82 and 84 mounted thereon between the supports 20 and 22 and the shaft 26 has a gear 86 mounted thereon between the supports 20 and 22. The gears 82 and 84 are drivingly meshed with the gear 86.

With attention now invited more specifically to FIG. 3 of the drawings, it may be seen that the casing 78 encloses a pair of lobed rotors 82 and 84 mounted on the shafts 28 and 30 for rotation therewith and that a diverter 86 is disposed within the inlet area of the casing 78. Further, each of the casings 32 and 34 includes a pair of rotors mounted therein on the shafts 28 and 30 corresponding to the rotors 82 and 84.

In operation, the lefthand end of the shaft 26 is initially driven from some outside power source (not shown) in order to drive the shafts 28 and 30 from the gear 86. Rotation of the shafts 28 and 30 will cause the rotors in the casings 32 and 34 to rotate in unison and to thereby pump air through the casing 32 and an overly rich air and fuel mixture through the casing 34. Thus, air will be pumped through the ducts 40 and 42 under pressure, past the check vales 60 and through the turbines 62 and 64. The turbines 62 and 64 cause the air and air and fuel mixtures to swirl in opposite directions for thorough commingling within the juncture chamber or structure 58 from which the combustible mixture is forced through the flow zone 66 and into the combustion chamber 68. When the engine 10 is being initially started, the glow plug 70 is connected to a suitable source (not shown) of electrical potential and the glow plug 70 functions to ignite the combustible mixture under pressure within the combustion chamber 68. The combustible mixture, upon ignition, rapidly expands and the hot exhaust gases are exhausted from the combustion chamber 68 to the inlet 76 of the casing 78 whereby the exhaust gases cause the rotors 82 and 84 to rotate. Of course, the rotors 82 and 84 drive the shafts 28 and 30 which in turn drive the main shaft 26. Inasmuch as the rotors 82 and 84 drive the shafts 28 and 30, the rotors within the chamber 32 and 34 corresponding to the rotors 82 and 84 are also driven.

The engine 10 may utilize various forms of fuel, such as gasoline, kerosine, various grades of oils, liquid petroleum gas and even finely powdered coal dust, which fuels may be mixed in an overly rich manner with air within the charge forming device 44 discharging into the inlet 38 for the casing 34.

Burning of the overly rich air and fuel mixture within the duct between the corresponding valve 60 and the chamber 58 is strongly resisted by the fact that the mixture does not support oxygen in sufficient quantities to support ready combustion. Further, the valves 60 prevent combustion gases from entering the ducts 40 and 42 upstream from the valves. Also, after operation of the engine has been started, the glow plug will maintain sufficient heat to imitate combustion without being electrically heated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a main rotary shaft, first and second rotary pumps driven from said main shaft each including an inlet and an outlet, mixing and combustion chamber means into which the outlets of said pumps open, the inlet of one of said pumps comprising an air inlet, the inlet of the other of said pumps comprising an air and fuel mixture inlet, charge forming means operatively connected to said inlet of the other pump for providing an overly rich mixture of air and fuel thereto, a rotary motor drivingly connected to said main shaft and including a combustion gas inlet and an exhaust outlet, said mixing and combustion chamber means including an outlet connected to said combustion gas inlet.

2. The combination of claim 1 wherein each of said pumps include a pair of first and second rotors and said motor includes a pair of first and second rotors, said pumps and motor each including a casing in which the corresponding rotors are rotatably received, a pair of parallel shafts, said shafts being journaled through said casings, the rotors in each of said casings being mounted on said shafts, means drivingly connecting said parallel shafts to said main shaft.

3. The combination of claim 2 wherein said casings are supported from said parallel shafts.

4. The combination of claim 1 wherein said mixing and combustion chamber means comprise mixing and combustion chambers connected in tandem.

5. The combination of claim 1 including check valve means disposed in said pump outlets upstream from said mixing and combustion chamber means.

6. The combination of claim 5 including free spinning turbine wheel means disposed in said pump outlets downstream from said check valve means and upstream from said mixing and combustion chamber means.

7. The combination of claim 6 wherein said mixing and combustion chamber means comprise mixing and combustion chambers connected in tandem.

8. The combination of claim 7 wherein each of said pumps include a pair of first and second rotors and said motor includes a pair of first and second rotors, said pumps and motor each including a casing in which the corresponding rotors are rotatably received, a pair of parallel shafts, said shafts being journaled through said casings, the rotors in each of said casings being mounted on said shafts, means drivingly connecting said parallel shafts to said main shaft.

9. The combination of claim 1 wherein said inlets for said pumps include adjustable flow controlling valve means operatively associated therewith for throttling the intake of air and air and fuel mixture into said pumps.

10. The combination of claim 9 including control means operatively connected to said flow controlling valve means for simultaneously adjustably controlling the same.

* * * * *